Patented Mar. 31, 1942

2,278,046

UNITED STATES PATENT OFFICE 2,278,046

RUBBER COMPOSITION AND METHOD OF PRESERVING RUBBER

Robert L. Sibley, Nitro, W. Va., assignor to Monsanto Chemical Company, St. Louis, Mo., a corporation of Delaware No Drawing. Application October 13, 1938, Serial No. 234,845

22 Claims. (Cl. 260—802)

The present invention relates to the art of rubber manufacture and particularly relates to rubber compositions which resist deterioration due to aging or to exposure to the atmosphere. It has long been known that such deterioration may be greatly retarded by treating the rubber before or after vulcanization with certain substances known as age-resistors or antioxidants. One object of this invention is to provide a superior class of antioxidants for rubber. A further object of this invention is to provide a class of materials which, when incorporated into rubber, preferably before the vulcanization thereof, impart thereto properties markedly resistant to tear and cracking when portions thereof have been repeatedly and alternately stretched and the tension removed. Such a process is analogous to the flexing of an automobile tire in actual road service.

The age resisting characteristics of a vulcanized rubber product can be readily ascertained by subjecting samples of the vulcanized product to the action of air or oxygen under elevated pressure and at elevated temperature. The aged rubber samples are then examined and tested and the test data compared with the results obtained on testing the unaged rubber samples. The deterioration in properties as a result of the oxidation treatment is indicative of the result that would normally be expected of that particular stock during actual service. Such a test produces an effect on a vulcanized rubber stock comparable with that resulting from several years of natural aging of the rubber depending upon the conditions of the test.

The flex cracking resistance of the vulcanized rubber products may be determined on a flexing machine as set forth by L. V. Cooper, Analytical Edition of Industrial and Engineering Chemistry, vol. 2, No. 4, 1930, pages 391–394.

This invention comprises more particularly treating rubber with a product obtainable by associating a carboxylic acid with a ketone-primary aromatic amine condensation product and effecting a reaction. The mere association of the reacting ingredients is often a sufficient condition for effecting a reaction but it is to be understood that the reaction products obtainable by the use of catalysts, the application of heat and other devices and methods for effecting a chemical reaction are likewise within the scope of the present invention. It has been found that by varying the conditions for carrying out the reactions different products are obtainable from the same reacting ingredients, all however exhibiting desirable antioxidant properties. The products obtainable by associating the carboxylic acid with the ketone-primary aromatic amine under relatively mild reacting conditions are believed to be carboxylic acid salts of the ketone-primary aromatic amines employed. In addition it is to be understood that the present invention comprises the products obtainable by associating carboxylic acids with ketone-primary aromatic amines under relatively severe reacting conditions and more particularly products obtainable by carrying out the reactions under such conditions that water is removed and in some cases gaseous by-products. The separation of water or other by-products would indicate a condensation type of reaction, and carboxylic acids are known to condense with simple aromatic amines, which would lead to the supposition that a ketone-primary aromatic amine could give a similar reaction. Thus, certain dyes such as diphenylamine blue and carbazole blue may be produced by the action of a carboxylic acid on an amine, the latter for example by the action of oxalic acid on marbazole. That the preferred class of materials might be the products of a similar type of reaction is only postulation and the invention is not limited to any such theory but it is set forth only to show that by the application of known chemical principles in a new way and to a different class of materials than heretofore employed, a new and useful result has been achieved.

In general the essential condition for preparing one of the preferred reaction products is to associate the carboxylic acid with the ketone-primary aromatic amine in such a manner that an intimate mixture is formed, a reaction taking place spontaneously. This may be accomplished without the use of a solvent by melting the reactants together and maintaining the fusion temperature until the mass is homogeneous throughout and employing the product so obtained directly as an antioxidant for rubber. If it is desired to use a solvent, the acid and the ketone-primary aromatic amine condensation product may first be dissolved in suitable organic solvents and the solutions thereupon combined. Heating is usually unnecessary, the reaction product immediately precipitating upon combining the solutions. The precipitate may be removed by filtration or any other convenient means, any unreacted materials remaining with the solvent. It is obvious that many variations may be introduced for effecting the reactions without departing from the spirit of the present invention. In carrying out reactions for the purpose of forming other embodiments of the invention, for example products formed by the accompanying removal of water, a convenient procedure is to mix directly the carboxylic acid with the ketone-primary aromatic amine condensation product and gradually raise the temperature until the desired reaction begins. Water usually separates from the mass at about 145° and it is generally not necessary to heat above 175° C. These temperatures are in nowise critical but illustrate in a general way the temperatures within which the desired reactions may be expected to take place. A convenient means of following the reaction is to place the reacting ingredients into a suitable container fitted with a condenser which is in turn fitted with a receptacle adapted for the collection of water. The temperature in the reaction flask, when water first begins to distill, may be regarded as the beginning of the reaction and this also gives an indication of the proper temperature for carrying out the reaction. The reaction may be assumed to be essentially complete when water no longer distills at a temperature somewhat above that at which the reaction began. The reaction product may be employed directly to prevent the deterioration of rubber or it may be further purified by any means conveniently adaptable to the chemical and physical properties of the product. The specific examples given below describe means by which this may be accomplished. Again many variations in the manipulation and means of effecting the reactions may be introduced without departing from the scope of the present invention.

In order to illustrate more fully the preferred class of compounds, their preparation and their desirable preservative properties when incorporated into rubber, the following specific embodiments of the invention are given. They are to be understood as illustrative of the invention and not a limitation thereof.

EXAMPLE I

A typical example of a product obtained by associating a carboxylic acid with a ketone primary aromatic amine under such conditions that water was removed from the reaction was prepared by heating substantially 0.2 molecular proportions of anhydrous oxalic acid with substantially 0.2 molecular proportions of the condensation product of one molecular proportion of p-amino biphenyl with two molecular proportions of acetone. A description of the preparation of this latter material may be found in United States Patent 2,062,885 to Joseph R. Ingram. Substantially 50 parts by weight of the p-amino biphenyl-acetone product (substantially 0.2 molecular proportions) and substantially 18 parts by weight of anhydrous oxalic acid (substantially 0.2 molecular proportions) were placed in a suitable container and the temperature of the mixture raised to 145–150° C. for 4 hours. During the heating water and inert gas were driven off. The reaction appeared substantially complete after the 4 hour heating period and the residue remaining in the reaction vessel was tested for its antioxidant properties in rubber as shown in Table I.

EXAMPLE II

In like manner the product obtained by condensing substantially one molecular proportion of p-phenetidine with two molecular proportions of acetone was heated with anhydrous oxalic acid to produce another typical example of the preferred class of materials. The heating in this case was continued for for 5 hours at 160–175° C. and, since the p-phenetidine acetone condensation product readily submits to distillation under reduced pressure, any unreacted materials were removed by distilling under 4 mm. pressure until a vapor temperature of 143° C. was reached, the bath temperature reaching 270° C. The residue remaining, comprising the preferred reaction product, was incorporated into rubber and found to exhibit good antioxidant properties. See Table I.

EXAMPLE III

The product obtained by condensing one molecular proportion of aniline with two molecular proportions of acetone and distilling, the product formed comprising essentially 2,2,4-trimethyl dihydro quinoline, was heated with anhydrous oxalic acid essentially as described above. The heating was again carried out at 160–175° C. for 5 hours after which unreacted materials were removed by distillation under 4 mm. pressure. The vapor temperature reached 120° C. and the bath temperature 240° C. The desired reaction product which remained after the distillation formed a dark brown solid upon cooling. On testing in rubber it exhibited excellent antioxidant properties as hereinafter shown in Table I.

EXAMPLE IV

This example illustrates the use of an acid other than oxalic in the preparation of the new class of compounds. 51.9 parts by weight (substantially 0.3 molecular proportions) of the condensation product of one molecular proportion of β naphthyl amine with two molecular proportions of acetone and 45.0 parts by weight (substantially 0.3 molecular proportions) of anhydrous tartaric acid were placed in a suitable container fitted with a condenser in turn fitted with a receptacle adapted for the collection of water removed in the reaction. The temperature in the reaction flask was gradually raised to 160–175° C. and maintained for 5 hours after which time, water and gas had ceased to evolve and the reaction otherwise appeared substantially complete. A total of 12 parts by weight of water was collected. The product so obtained exhibited good antioxidant properties when incorporated into a typical rubber stock. See Table I.

EXAMPLE V

This example further illustrates the use of other carboxylic acids in the preparation of the preferred class of materials. 40 parts by weight of formic acid and 40 parts by weight of the condensation product of one molecular proportion of benzidine with 4 molecular proportions of acetone were placed in a suitable container and heated for eight hours at substantially 100° C. Unreacted materials were removed from the reaction mixture leaving the desired reaction product which proved to be a solid melting at 85° C. Its desirable antioxidant properties are shown in Table I.

EXAMPLE VI

Derivatives of ketone-primary aromatic amines may also be employed in the preparation of the new class of materials and are included within the scope of this invention. Thus, a product obtained by treating the condensation product of one molecular proportion of aniline with two molecular proportions of acetone, or in other words 2,2,4-trimethyl dihydroquinoline, with hydrochloric acid was heated with anhydrous oxalic acid. A description of the preparation of mineral acid treated 2,2,4-trimethyl dihydroquinoline may be found in United States Patent 2,064,752 to Joseph R. Ingram. The mixture was heated at 160-175° C. for 6 hours after which time the reaction was substantially complete. The product which remained was a resinous mass with a greenish cast and on incorporating into rubber exhibited desirable antioxidant properties as shown in Table I.

The product described in the above six examples were introduced into a typical rubber stock comprising:

|  | Stock, parts by weight | | | | | |
|---|---|---|---|---|---|---|
|  | A | B | C | D | E | F |
| Smoked sheets or rubber | 100 | 100 | 100 | 100 | 100 | 100 |
| Carbon black | 50 | 50 | 50 | 50 | 50 | 50 |
| Zinc oxide | 5 | 5 | 5 | 5 | 5 | 5 |
| Sulfur | 3 | 3 | 3 | 3 | 3 | 3 |
| Pine tar | 2 | 2 | 2 | 2 | 2 | 2 |
| Stearic acid | 3 | 3 | 3 | 3 | 3 | 3 |
| Benzothiazyl thiobenzoate | 0.8 | 0.8 | 0.8 | 0.8 | 0.8 | 0.8 |
| Diphenyl guanidine | 0.2 | 0.2 | 0.2 | 0.2 | 0.2 | 0.2 |
| Reaction product of p-amino diphenyl-acetone and oxalic acid | 1 |  |  |  |  |  |
| Reaction product of aniline-acetone and oxalic acid |  | 1.0 |  |  |  |  |
| Reaction product of p-phenetidine-acetone and oxalic acid |  |  | 1.0 |  |  |  |
| Reaction product of naphthylamine-acetone and oxalic acid |  |  |  | 1.0 |  |  |
| Reaction product of benzidine-acetone and formic acid |  |  |  |  | 1.0 |  |
| Reaction product of aniline-acetone treated with mineral acid and oxalic acid |  |  |  |  |  | 1.0 |

The rubber stocks so compounded were vulcanized in a press at the temperature of 30 pounds steam pressure per square inch and portions of the vulcanized products were then artificially aged by heating in a bomb for 96 and 120 hours respectively at a temperature of 70° C. and under a pressure of 300 pounds of oxygen per square inch. A comparison between the aged and unaged cured rubber products is given in Table I.

*Table I*

| Stock | Cure time in mins. | Hours aged | Modulus of elasticity in lbs./in.$^2$ at elongations of— | | Tensile at break, in lbs./in.$^2$ | Ult. elong., percent |
|---|---|---|---|---|---|---|
|  |  |  | 200% | 400% |  |  |
| A | 60 | 0 | 830 | 2,510 | 3,650 | 530 |
| A | 60 | 96 | 1,005 | 2,095 | 2,095 | 400 |
| A | 60 | 120 | 940 |  | 1,900 | 320 |
| B | 60 | 0 | 1,100 | 3,020 | 4,075 | 525 |
| B | 60 | 96 | 1,080 | 2,490 | 2,825 | 430 |
| B | 60 | 120 | 850 | 1,865 | 1,960 | 410 |
| C | 60 | 0 | 1,120 | 3,060 | 4,000 | 510 |
| C | 60 | 96 | 890 |  | 1,675 | 360 |
| C | 60 | 120 | 595 |  | 865 | 310 |
| D | 60 | 0 | 1,040 | 2,840 | 4,150 | 545 |
| D | 60 | 96 | 910 | 2,070 | 2,325 | 450 |
| D | 60 | 120 | 785 | 1,660 | 1,660 | 400 |
| E | 60 | 0 | 1,010 | 2,780 | 3,725 | 500 |
| E | 60 | 96 | 1,125 |  | 2,300 | 390 |
| E | 60 | 120 | 1,075 |  | 1,825 | 330 |
| F | 60 | 0 | 930 | 2,660 | 3,550 | 510 |
| F | 60 | 96 | 1,005 | 2,050 | 2,050 | 400 |
| F | 60 | 120 | 965 |  | 1,725 | 375 |
| A | 75 | 0 | 950 | 2,700 | 3,650 | 510 |
| A | 75 | 96 | 1,070 |  | 2,060 | 375 |
| A | 75 | 120 | 1,055 |  | 1,800 | 330 |
| B | 75 | 0 | 1,140 | 3,140 | 4,100 | 510 |
| B | 75 | 96 | 1,120 | 2,520 | 2,725 | 420 |
| B | 75 | 120 | 1,000 |  | 1,780 | 360 |
| C | 75 | 0 | 1,275 | 3,230 | 4,100 | 500 |
| C | 75 | 96 | 940 |  | 1,500 | 320 |
| C | 75 | 120 | 820 |  | 800 | 300 |
| D | 75 | 0 | 1,100 | 3,040 | 4,050 | 510 |
| D | 75 | 96 | 980 | 2,160 | 2,160 | 400 |
| D | 75 | 120 | 865 | 1,720 | 1,720 | 400 |
| E | 75 | 0 | 1,140 | 2,960 | 3,775 | 490 |
| E | 75 | 96 | 1,195 |  | 2,110 | 380 |
| E | 75 | 120 | 1,135 |  | 1,820 | 310 |
| F | 75 | 0 | 2,680 | 2,680 | 3,700 | 505 |
| F | 75 | 96 | 1,075 |  | 1,925 | 365 |
| F | 75 | 120 | 1,015 |  | 1,500 | 320 |
| A | 90 | 0 | 1,000 | 2,800 | 3,680 | 505 |
| A | 90 | 96 | 1,095 |  | 1,975 | 350 |
| A | 90 | 120 | 1,050 |  | 1,650 | 320 |
| B | 90 | 0 | 1,240 | 3,240 | 4,100 | 495 |
| B | 90 | 96 | 1,300 |  | 2,675 | 380 |
| B | 90 | 120 | 1,000 |  | 1,780 | 360 |
| C | 90 | 0 | 1,285 | 3,260 | 3,960 | 480 |
| C | 90 | 96 | 930 |  | 1,325 | 290 |
| C | 90 | 120 | 600 |  | 700 | 275 |
| D | 90 | 0 | 1,150 | 3,060 | 4,000 | 500 |
| D | 90 | 96 | 1,010 | 2,165 | 2,165 | 400 |
| D | 90 | 120 | 930 |  | 1,610 | 360 |
| E | 90 | 0 | 1,085 | 2,980 | 3,625 | 470 |
| E | 90 | 96 | 1,200 |  | 1,925 | 325 |
| E | 90 | 120 | 1,120 |  | 1,750 | 310 |
| F | 90 | 0 | 2,910 | 2,910 | 3,775 | 500 |
| F | 90 | 96 | 1,080 |  | 1,900 | 360 |
| F | 90 | 120 | 1,040 |  | 1,500 | 310 |

The data set forth in Table I show the typical desirable aging qualities of the preferred class of materials. In addition the above described rubber stocks were tested on a flexing machine in the manner hereinbefore set forth and found to be markedly superior in flex cracking resistance over a stock containing none of the preferred class of materials. Moreover, a considerable proportion of the preferred materials which were so tested provided, when incorporated into rubber, rubber products showing flex cracking resistance superior to that of rubber products containing antioxidants commonly employed commercially.

Another important improvement exhibited by compounds of the present invention over the ketone-primary aromatic amines themselves is a decreased tendency to discolor materials in contact with rubber products treated therewith. Paper boxes and wrappings which come in contact with rubber products, for example boxes employed to store inner tubes for pneumatic tires, tend to become discolored when certain ketone-primary aromatic amines are employed as the antioxidant. This is due, it is believed, to a slight volatility of the ketone-primary aromatic amine and the improvement exhibited by the preferred class of materials is therefore thought to be the result of their decreased volatility. Thus, it will be noted as shown in Examples II and III that unreacted materials such as the original ketone-primary aromatic amine can usually be distilled off leaving the less volatile reaction product comprising the preferred class of antioxidants. A considerable variety of substances have been observed to discolor when in contact with rubber treated with typical ketone-primary aromatic amine antioxidants such as acetone-aniline, acetone-aniline treated with mineral acid and acetone-p-amino diphenyl. For example clays from the roads in various sections of the country such as the South and Southwest collect on the tires of automobiles and when ketone-primary aromatic amines, which are otherwise desirable antioxidants, are employed in compounding the tires, the clay deposits are badly discolored thus developing undesirable properties in said rubber tires. In order to show the superiority of the preferred antioxidants, a clay exhibiting the usual tendency to discolor was made into a thin paste and spread upon rubber sheets containing typical examples of the preferred class of materials and upon rubber sheets containing typical ketone-primary aromatic amines and the rubber sheets with the clay spread thereon were allowed to stand at room temperature. It was found that at the time when the clay layers spread upon the rubber sheets containing the typical ketone-primary aromatic amines were badly discolored, the preponderance of the clay layers spread upon the rubber sheets containing typical examples of the preferred class of materials showed no visible discoloration.

The preparation of the preferred class of materials under such conditions that salt formation would normally be expected has been described in general above and the following specific embodiments of the invention describe in greater detail means by which they may be obtained and their useful antioxidant properties.

Example VII 22 parts by weight of a product obtained by condensing aniline with diacetone alcohol was dissolved in a suitable quantity of ethyl ether and the solution allowed to stand until clear whereupon it was decanted from a small amount of tarry matter which has settled out. To this solution was then added slowly with agitation 9 parts by weight of anhydrous oxalic acid dissolved in a convenient quantity of ethyl ether. An amorphous precipitate formed immediately and was filtered off and washed with ether. A good yield of a white product melting at 135–136° was obtained.

Example VIII

The tartrate of aniline-diacetone alcohol was prepared in a manner slightly different from that described for the oxalate above. 20 parts by weight of a product obtained by condensing aniline with diacetone alcohol were added with agitation to a solution of 10 parts by weight of tartaric acid dissolved in a suitable quantity of ethyl alcohol. The mixture was warmed to 50° C. and allowed to stand for approximately 12 hours after which a good yield of light brown crystals melting at 160–162° C. were filtered from the solution.

The products described in the last two examples (Examples VII and VIII) were incorporated into typical rubber stocks comprising:

|  | Parts by weight | |
|---|---|---|
|  | G | H |
| Smoked sheets of rubber | 100 | 100 |
| Carbon black | 40 | 40 |
| Zinc oxide | 10 | 10 |
| Sulfur | 3 | 3 |
| Pine tar | 2 | 2 |
| Stearic acid | 3 | 3 |
| Benzothiazyl thiobenzoate | 0.8 | 0.8 |
| Diphenyl guanidine | 0.2 | 0.2 |
| Aniline-diacetone alcohol oxalate | 1.0 | |
| Aniline-diacetone alcohol tartrate | | 1.0 |

The rubber stocks so compounded were vulcanized in a press at the temperature of 25 pounds steam pressure per square inch and portions of the vulcanized products were then artificially aged by heating in a bomb for 48 hours at a temperature of 70° C. and under a pressure of 300 pounds of oxygen per square inch. A comparison between the aged and unaged rubber products is given in Table II.

Table II

| Stock | Cure time in mins. | Hours aged | Modulus of elasticity in lbs./in.$^2$ at elongations of— | | Tensile at break, in lbs./in.$^2$ | Ult. elong., percent |
|---|---|---|---|---|---|---|
|  |  |  | 300% | 500% |  |  |
| G | 60 | 0 | 1,795 | 3,800 | 4,780 | 610 |
| G | 60 | 48 | 1,533 | 2,780 | 2,960 | 530 |
| H | 60 | 0 | 1,815 | 3,910 | 4,800 | 595 |
| H | 60 | 48 | 1,525 | 2,825 | 3,090 | 540 |
| G | 75 | 0 | 1,900 | 4,080 | 4,550 | 560 |
| G | 75 | 48 | 1,620 | 2,760 | 2,760 | 500 |
| H | 75 | 0 | 1,920 | 4,100 | 4,685 | 565 |
| H | 75 | 48 | 1,648 | 3,040 | 3,040 | 500 |
| G | 90 | 0 | 2,020 | 4,160 | 4,615 | 530 |
| G | 90 | 48 | 1,665 |  | 2,720 | 480 |
| H | 90 | 0 | 2,070 | 4,200 | 4,680 | 560 |
| H | 90 | 48 | 1,760 | 3,020 | 3,020 | 500 |

The above data further show the desirable antioxidant properties of the preferred class of materials and more particularly the reaction products of ketone-primary aromatic amines with carboxylic acid produced under such conditions that salt formation would normally be expected.

A number of specific embodiments of the invention have been hereinbefore given illustrating the preparation and desirable properties of the new and preferred class of antioxidants and it has been thereby shown that a class of materials comprising broadly the products produced by the action of carboxylic acids on ketone-primary aromatic amines possess useful properties. It is apparent to anyone skilled in the art to which the present invention pertains that a wide variety of methods of manipulation and conditions may be adapted to the preparation of the preferred class of materials. For example the solvents disclosed in Examples VII and VIII may be replaced by other suitable solvents and where convenient or desirable solvents may be eliminated altogether. Furthermore, the relatively pure aniline-acetone condensation product comprising essentially 2,2,4-trimethyl dihydroquinoline which was employed in Example III, may be replaced by the crude reaction product from which it was obtained thus further illustrating the wide applicability of the present invention. A wide variety of ketone-primary aromatic amine products may be employed in the preparation of the preferred class of materials. For example, the products produced by reacting other proportions of ketone and primary aromatic amine, than those specifically mentioned, may be employed in the preparation of the preferred class of materials for, in the present invention, ketone-primary aromatic amine products produced in any and all proportions are applicable. Ketone-primary aromatic amines make up a well known class of products and reference must largely be had to the chemical literature for details of their preparation and properties. The invention is not limited to the particular ketone-primary aromatic amines mentioned in the examples describing the preparation of the preferred materials nor to those mentioned below. As further typical examples may be mentioned acetone-p,p' diamino diphenyl methane, acetone-p,p' diamino di α naphthyl methane, acetone-o-amino biphenyl, methyl ethyl ketone-p-amino biphenyl, methyl ethyl ketone-benzidine, methyl ethyl ketone-p-phenetidine, acetone-p,p'diamino diphenyl ethane, methyl ethyl ketone-p,p'diamino diphenyl ethane, diacetone alcohol-aniline, cyclohexanone-aniline, acetone-p-toluidine, acetone-4 amino 4' methyl diphenyl ether, methyl ethyl ketone-2 amino diphenyl ether, acetone-4 amino phenyl α naphthyl ether, acetone-p-amino diphenyl thio ether, acetone-4 amino 4' methyl diphenyl thio ether, acetone-4 amino phenyl β naphthyl thio ether, dibenzyl ketone-p-amino diphenyl thio ether, and methyl ethyl ketone-p-amino diphenyl thio ether.

Other carboxylic acids than those specifically mentioned in the examples may be employed in the preparation of the new and preferred class of antioxidants. For example in addition to tartaric, formic and oxalic acid there may be employed malonic acid, succinic acid, propionic acid, lactic acid, glycollic acid, glutaric acid, acetic acid and equivalents and analogues thereof.

It is obvious that practice of the present invention is not limited to the specific compositions given above, such compositions being merely illustrative of the manner of employing the antioxidants or age-resistors of the invention. The antioxidants or age-resistors may be employed in different proportions than herein described and in conjunction with other vulcanizing agents than those specifically disclosed, for this invention is applicable generally to pure rubber or rubber compositions of the most varied sort. Furthermore, the preferred class of materials may be employed in conjunction with other accelerators than those specifically shown with varying degrees in tensile and modulus properties but still exhibiting the desirable properties of the class.

It is to be understood that the term "treating" as employed in the appended claims is used in a generic sense to include either the incorporating of the preferred class of materials into the rubber by milling or similar process, or their addition to the rubber latex before its coagulation, or the application thereof to the surface of a mass of crude or vulcanized rubber. The term "a rubber" is employed in the claims to define a vulcanizable plastic material which possesses high extensibility under load coupled with the property of forcibly retracting to approximately its original size and shape after the load is removed. Such products include, for example, india rubber, reclaimed rubber, balata, gutta percha and other natural or synthetic vulcanizable products which deteriorate upon aging whether or not admixed with fillers, pigments or accelerating agents.

The present invention is limited solely by the claims attached hereto as part of the present specification.

What is claimed is:

1. The method of preserving a rubber which comprises treating a rubber with a product obtained by associating a carboxylic acid with a condensation product of a ketone and a primary aromatic amine in an amount at least sufficient to combine with the basic constituents of the ketone-amine and effecting a reaction by heating at such a temperature that water is removed from the reaction mixture in an amount in substantial excess of any free or combined water present as such.

2. The method of preserving india rubber which comprises treating india rubber with a product obtained by associating an aliphatic carboxylic acid containing more than one carbon atom with a condensation product of an aliphatic ketone and a primary aromatic amine in an amount at least sufficient to combine with the basic constituents of the ketone-amine and effecting a reaction by heating at such a temperature that water is removed from the reaction mixture in an amount in substantial excess of any free or combined water present as such.

3. The method of preserving a rubber which comprises treating a rubber with a product obtained by associating an aliphatic dibasic carboxylic acid with a condensation product of an aliphatic ketone and a primary aromatic amine in an amount at least sufficient to combine with the basic constituents of the ketone-amine and effecting a reaction by heating at such a temperature that water is removed from the reaction mixture in an amount in substantial excess of any free or combined water present as such.

4. The method of preserving a rubber which comprises treating a rubber with a product obtained by associating an aliphatic carboxylic acid containing more than one carbon atom with a condensation product of an aliphatic ketone and a primary aromatic amine in substantially equimolecular proportions and effecting a reaction by heating at such a temperature that water is removed from the reaction mixture in an amount in substantial excess of any free or combined water present as such.

5. The method of preserving a rubber which comprises treating a rubber with a product obtained by associating oxalic acid with a condensation product of an aliphatic ketone and a primary aromatic amine in an amount at least sufficient to combine with the basic constituents of the ketone-amine and effecting a reaction by heating at such a temperature that water is removed from the reaction mixture in an amount in substantial excess of any free or combined water present as such.

6. The method of preserving india rubber which comprises treating india rubber with a product obtained by associating an aliphatic carboxylic acid containing more than one carbon atom with a condensation product of acetone and a primary aromatic amine in an amount at least sufficient to combine with the basic constituents of the ketone-amine and effecting a reaction by heating at such a temperature that water is removed from the reaction mixture in an amount in substantial excess of any free or combined water present as such.

7. The method of preserving a rubber which comprising treating india rubber with a product obtained by associating oxalic acid with the condensation product of p-amino diphenyl and acetone in substantially equimolecular proportions and effecting the reaction by heating at such a temperature that water is removed from the reaction mixture in an amount in substantial excess of any free or combined water present as such.

8. The method of preserving a rubber which comprises treating a rubber with a product obtained by associating oxalic acid with the condensation product of aniline and acetone in substantially equimolecular proportions and effecting the reaction by heating at such a temperature that water is removed from the reaction mixture in an amount in substantial excess of any free or combined water present as such.

9. The method of preserving a rubber which comprises treating a rubber with a product obtained by associating tartaric acid with the condensation product of β naphthylamine and acetone in substantially equimolecular proportions and effecting the reaction by heating at such a temperature that water is removed from the reaction mixture in an amount in substantial excess of any free or combined water present as such.

10. The vulcanized rubber product prepared by heating a rubber and sulfur in the presence of a product obtained by associating a carboxylic acid with a condensation product of a ketone and a primary aromatic amine in an amount at least sufficient to combine with the basic constituents of the ketone-amine and effecting a reaction by heating at such a temperature that water is removed from the reaction mixture in an amount in substantial excess of any free or combined water present as such.

11. The vulcanized rubber product prepared by heating india rubber and sulfur in the presence of a product obtained by associating an aliphatic carboxylic acid containing more than one carbon atom with a condensation product of an aliphatic ketone and a primary aromatic amine in an amount at least sufficient to combine with the basic constituents of the ketone-amine and effecting a reaction by heating at such a temperature that water is removed from the reaction mixture in an amount in substantial excess of any free or combined water present as such.

12. The vulcanized rubber product prepared by heating a rubber and sulfur in the presence of a product obtained by associating an aliphatic dibasic carboxylic acid with a condensation product of an aliphatic ketone and primary aromatic amine in an amount at least sufficient to combine with the basic constituents of the ketone-amine and effecting a reaction by heating at such a temperature that water is removed from the reaction mixture in an amount in substantial excess of any free or combined water present as such.

13. The vulcanized rubber product prepared by heating a rubber and sulfur in the presence of a product obtained by associating an aliphatic carboxylic acid containing more than one carbon atom with a condensation product of an aliphatic ketone and a primary aromatic amine in substantially equimolecular proportions and effecting a reaction by heating at such a temperature that water is removed from the reaction mixture in an amount in substantial excess of any free or combined water present as such.

14. The vulcanized rubber product prepared by heating a rubber and sulfur in the presence of a product obtained by associating oxalic acid with a condensation product of an aliphatic ketone and a primary aromatic amine in an amount at least sufficient to combine with the basic constituents of the ketone-amine and effecting a reaction by heating at such a temperature that water is removed from the reaction mixture in an amount in substantial excess of any free or combined water present as such.

15. The vulcanized rubber product prepared by heating india rubber and sulfur in the presence of a product obtained by associating an aliphatic carboxylic acid containing more than one carbon atom with a condensation product of acetone and a primary aromatic amine in an amount at least sufficient to combine with the basic constituents of the ketone-amine and effecting a reaction by heating at such a temperature that water is removed from the reaction mixture in an amount in substantial excess of any free or combined water present as such.

16. The vulcanized rubber product prepared by heating a rubber and sulfur in the presence of a product obtained by associating oxalic acid with the condensation product of p-amino diphenyl and acetone in substantially equimolecular proportions and effecting the reaction by heating at such a temperature that water is removed from the reaction mixture in an amount in substantial excess of any free or combined water present as such.

17. The vulcanized rubber product prepared by heating a rubber and sulfur in the presence of a product obtained by associating oxalic acid with the condensation product of aniline and acetone in substantially equimolecular proportions and effecting the reaction by heating at such a temperature that water is removed from the reaction mixture in an amount in substantial excess of any free or combined water present as such.

18. The vulcanized rubber product prepared by heating a rubber and sulfur in the presence of a product obtained by associating tartaric acid with the condensation product of β naphthylamine and acetone in substantially equimolecular proportions and effecting the reaction by heating at such a temperature that water is removed from the reaction mixture in an amount in substantial excess of any free or combined water present as such.

19. The method of preserving india rubber which comprises treating india rubber with a product obtained by associating oxalic acid with a condensation product of an aliphatic ketone and a primary aromatic amine in an amount at least sufficient to combine with the basic constituents of the ketone-amine and effecting a reaction by heating at 145–175° C. until water no longer distills from the reaction mixture.

20. The method of preserving a rubber which comprises treating a rubber with a product obtained by associating substantially equimolecular proportions of oxalic acid and a condensation product of acetone and a primary aromatic amine and effecting a reaction by heating at 145–175° C. until water no longer distills from the reaction mixture.

21. The vulcanized rubber product prepared by heating india rubber and sulfur in the presence of a product obtained by associating oxalic acid with a condensation product of an aliphatic ketone and a primary aromatic amine in an amount at least sufficient to combine with the basic constituents of the ketone-amine and effecting a reaction by heating at 145–175° C. until water no longer distills from the reaction mixture.

22. The vulcanized rubber product prepared by heating a rubber and sulfur in the presence of a product obtained by associating substantially equimolecular proportions of oxalic acid and a condensation product of acetone and a primary aromatic amine and effecting a reaction by heating at 145–175° C. until water no longer distills from the reaction mixture.

ROBERT L. SIBLEY.